P. CAMMANS.
SUBMERSIBLE COOKING APPARATUS.
APPLICATION FILED OCT. 4, 1918.

1,317,071.

Patented Sept. 23, 1919.

Inventor
Paul Cammans
By Attorney

UNITED STATES PATENT OFFICE.

PAUL CAMMANS, OF SEATTLE, WASHINGTON.

SUBMERSIBLE COOKING APPARATUS.

1,317,071.  Specification of Letters Patent.  Patented Sept. 23, 1919.

Continuation of application Serial No. 198,640½, filed October 26, 1917. This application filed October 4, 1918. Serial No. 256,824.

*To all whom it may concern:*

Be it known that I, PAUL CAMMANS, a citizen of Holland, residing at Seattle, in the county of King and the State of Washington, have invented a new and useful Submersible Cooking Apparatus, of which the following is a specification.

My invention relates to improvements in submersible cookers and the object of my invention is to provide a submersible cooker, which shall be so constructed, that it shall be extensible and adapted to contain and confine within it a required quantity of prepared food, which quantity of food may be cooked by submerging the cooker in boiling water without subjecting said food to a contact with said water.

Furthermore and especially, that it shall be so constructed, that it shall, in a simple manner, enable the user to regulate the space in which the food is confined, thereby controlling the amount of moisture that shall reach the food, which amount of moisture in turn controls the consistency or degree of "thickness" or richness of the food undergoing preparation.

Figure 1:
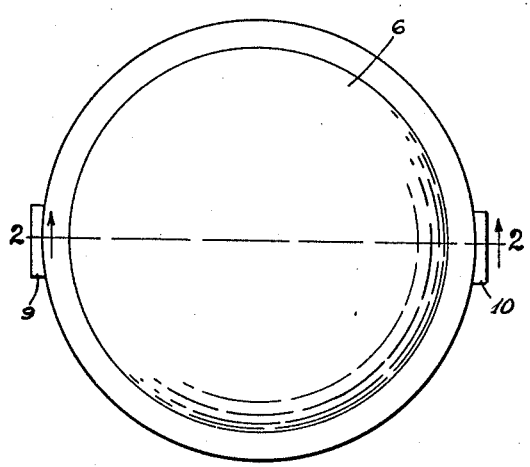
Figure 2:
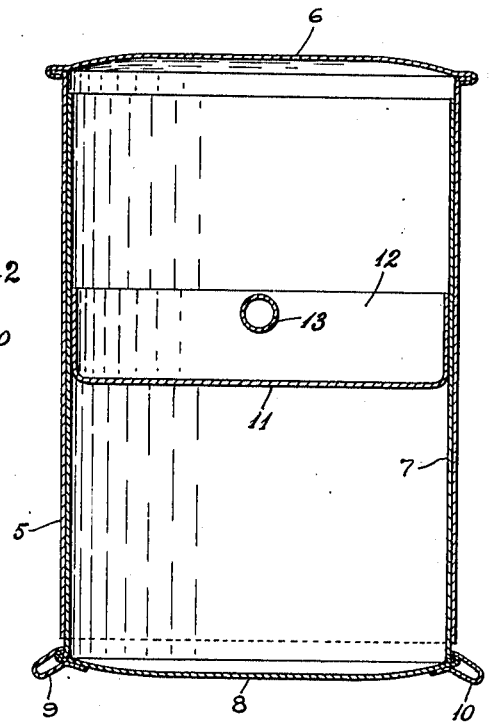
Figure 3:
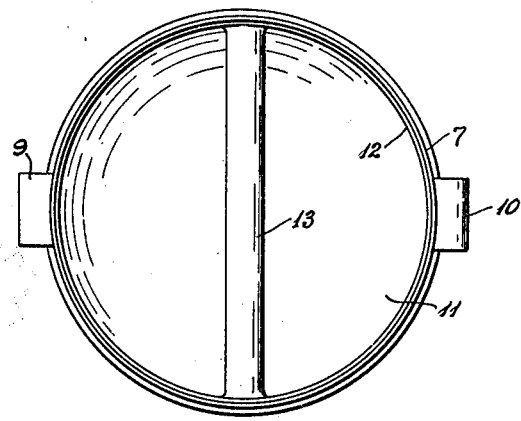

I accomplish this object by devices illustrated in the accompanying drawings, wherein: Figure 1 is a plan view of the cooker embodying my invention. Fig. 2 is a view of the same in vertical mid-section on broken line 2, 2, of Fig. 1, and Fig. 3 is a plan view of a detail of the same.

Referring to the drawing, throughout which like reference numerals indicate like parts, the numeral 5 designates a hollow cylinder whose flanged upper end is closed by a circular wall 6, which flange is intended to take the place of handles, except in the larger sizes, and within which hollow cylinder is slidably disposed another hollow cylinder 7, whose lower end is closed by a circular wall 8, whereby is formed an extensible receptacle comprising two separable members, that are telescopically joined as illustrated in Fig. 2. Attached to the edge portion of circular wall 8, are two lugs or eyes, 9 and 10, which lugs or eyes 9 and 10, may also be grasped by one's hand to facilitate the operation of slidably moving the hollow cylinder 7, in lengthwise directions, wholly to withdraw it from the hollow cylinder 5, or to dispose any part of its length within said hollow cylinder 5, thereby to extend or contract the interior space of the receptacle between its walls 6 and 8. Obviously more than two of these eyes or lugs, (preferably three, so that one shall always be more or less in a vertical direction), may be used, the especial use of them being, that they also facilitate the lifting of the cooker from the pot or vessel (wherein during the period of cooking the apparatus is placed) either with one's fingers, or by inserting an instrument such as a fork for instance, which lifting in this manner, causes the cooker to so hang, that all surplus water is immediately drained out.

Within the hollow cylinder 7, is a slidably movable partition 11, which is provided with an integral circular flange 12, that projects upwardly therefrom in frictional engagement, with the inner surface of said hollow cylinder 7, as more clearly shown in Fig. 2.

A handle 13, is disposed to extend directly between and is fastened at diametrically opposite points of the inner surface of the flange 12, which handle 13, may be grasped by one's hand, slidably to move the partition 11 to any desired position distant from the wall 8.

My invention provides that more than one such partition may be used simultaneously, so that more than one kind of food may be cooked at the same time. In utilizing a submersible cooker embodying my invention, first, all members of the cooker are separated, then, if the quantity of prepared food to be cooked, be sufficient to fill the hollow cylinder 7, it is disposed therein, whereupon said hollow cylinder 7 is projected into the cylinders 5, to its full extent, and thereupon the cooker is submerged in boiling water, preferably with its walls 6 and 8 in vertical planes, there to remain for a sufficient time to cook its contents.

Under such conditions of use the movable partition 11 is not employed, but if the quantity of prepared food to be cooked be less than sufficient to fill the hollow cylinder 7, then, however small such quantity may be, it is placed within said hollow cylinder 7, whereupon the movable partition 11 is disposed within said hollow cylinder 7, and pushed downwardly until it touches said food, there to confine it in a given space, after which that part of the cooker is submerged in boiling water for a time sufficient to cook its contents.

If it be desired to cook prepared food of a greater amount than can be contained in the hollow cylinder 7, then after said hollow cylinder 7 is almost filled, the excess quantity is placed in the hollow cylinder 5, whereupon said hollow cylinders 5 and 7 are telescopically joined with sufficient force, so that the two portions of prepared food are compressed into a single mass, the movable partition 11, not being used, and the frictionally engaged surfaces of the telescopic joint serving to maintain said hollow cylinders 5 and 7 in such fixed relative positions as will confine said prepared food in the space thus allowed, during the operation of cooking. In case where dry food, such as rice, hulled barley, etc., is to be cooked, the natural swelling of the food will take care of itself, though a given space may also be allowed, whether the inside or the outside part is used.

In most cases it is important that during the operation of cooking, the cooker be disposed in the boiling water, with its cylindrical side-walls in a horizontal direction, though it may also be used in a vertical position.

A cooker thus embodying my invention is particularly useful for cooking cereals, such as rice, oats, little split peas, etc., in which case the food may be put in either dry or mixed with water or milk, as suits individual liking.

The especial result attained in this, my cooker, is the complete control it furnishes of the amount of moisture that reaches the food, which amount of moisture in turn controls the consistency or degree of "thickness" or richness of the food undergoing preparation.

Another important result attained, with my invention, is the almost complete lack of attention required in its use, after putting the same on the fire, enabling the user to engage in other work far more freely or to leave the house entirely for a long period of time, or to lie down to rest, with far less danger of the food burning or even drying out and so changing its consistency.

Obviously, changes may be made in the forms and dimensions of parts of my invention without departing from the spirit thereof.

What I claim is:—

A submersible cooker of the class described, which embodies two hollow cylinders, one end of each of which is closed by an end wall and one of which cylinders is adapted to be slidably disposed within the other, to form a telescopic joint therebetween, whereby the interior space between said end walls may be varied; and a removable partition slidably disposed within one of said hollow cylinders.

PAUL CAMMANS.

Copies of this patent may be obtained for five cents each, by addressing the "Commissioner of Patents, Washington, D. C."